United States Patent
Histed et al.

(10) Patent No.: US 12,305,916 B2
(45) Date of Patent: May 20, 2025

(54) METHOD TO CONVERT EXCESS LIQUID OXYGEN INTO LIQUID NITROGEN

(71) Applicant: Airgas, Inc., Radnor, PA (US)

(72) Inventors: Adam Histed, Lafayette Hill, PA (US); Paul Sweeney, King of Prussia, PA (US)

(73) Assignee: Airgas, Inc., Radnor, PA (US)

( * ) Notice: Subject to any disclaimer, the term of this patent is extended or adjusted under 35 U.S.C. 154(b) by 795 days.

(21) Appl. No.: 17/495,385

(22) Filed: Oct. 6, 2021

(65) Prior Publication Data

US 2022/0112083 A1    Apr. 14, 2022

Related U.S. Application Data (60) Provisional application No. 63/089,578, filed on Oct. 9, 2020.

(51) Int. Cl.
*F25J 3/04*    (2006.01)
*C01B 21/02*   (2006.01)
(Continued)

(52) U.S. Cl.
CPC ............ *F25J 1/0015* (2013.01); *C01B 21/02* (2013.01); *F25J 1/004* (2013.01); *F25J 3/0406* (2013.01);
(Continued)

(58) Field of Classification Search
None
See application file for complete search history.

(56) References Cited

U.S. PATENT DOCUMENTS

| 5,228,297 A | 7/1993 | Olson, Jr. et al. |
| 2010/0018218 A1 | 1/2010 | Riley et al. |

(Continued)

FOREIGN PATENT DOCUMENTS

| CN | 201628446 | 11/2010 |
| CN | 110779277 | 2/2020 |

(Continued)

OTHER PUBLICATIONS

Stonehill et al., "Solar neutrinos from CNO electron capture." Physical Review C 69, 015801 (2004).*

(Continued)

*Primary Examiner* — Daniel Berns
(74) *Attorney, Agent, or Firm* — Elwood L. Haynes (57) ABSTRACT

A method for converting excess liquid oxygen into liquid nitrogen, including introducing a gaseous nitrogen stream into a main heat exchanger, therein exchanging heat with a vaporized oxygen stream, a vapor phase nitrogen steam, and a waste liquid nitrogen stream; thereby producing a cold gaseous nitrogen stream, an oxygen vent stream, a nitrogen vent steam, and a gaseous nitrogen waste stream, introducing the cold gaseous nitrogen stream into a secondary heat exchanger, therein exchanging heat with a liquid oxygen stream; thereby producing the vaporized oxygen stream and a cold liquid nitrogen stream, introducing the cold liquid nitrogen stream into a nitrogen pressure reduction valve thereby producing a two-phase nitrogen stream, introducing the two-phase nitrogen stream into a nitrogen flash vessel thereby producing a liquid phase nitrogen stream and the vapor phase nitrogen stream, wherein the method is performed in the absence of refrigerant turbo-expanders, refrigerant expansion turbines, or refrigerant compressors.

8 Claims, 5 Drawing Sheets

(51) Int. Cl.
    *C01B 21/04*     (2006.01)
    *F25J 1/00*     (2006.01)

(52) U.S. Cl.
    CPC ....... *F25J 3/04224* (2013.01); *F25J 3/04503* (2013.01); *F25J 2230/42* (2013.01); *F25J 2250/42* (2013.01); *F25J 2250/50* (2013.01)

(56) References Cited

U.S. PATENT DOCUMENTS

| | | |
|---|---|---|
| 2014/0352353 A1 | 12/2014 | Willolik |
| 2018/0313603 A1 | 11/2018 | Nagata et al. |
| 2020/0132367 A1 | 4/2020 | Tranier |
| 2020/0240687 A1 | 7/2020 | Kenefake et al. |

FOREIGN PATENT DOCUMENTS

| | | | |
|---|---|---|---|
| CN | 210602468 U | 5/2020 | |
| WO | WO 2017 024235 | 2/2017 | |
| WO | WO-2018215716 A1 * | 11/2018 | ............. F25J 1/0012 |

OTHER PUBLICATIONS

EPO Search/Patentability Report for EP application EP21201484 (dated Mar. 24, 2022).*

Anonymous Ed—Darl Kuhn: Unit for the recovery and storage of oxygen (URASO), IP.com, West Henrietta, NY, US, Mar. 15, 2004, 4 pages.

International Search Report and Written Opinion for corresponding EP 21201484, Mar. 11, 2022.

* cited by examiner

METHOD TO CONVERT EXCESS LIQUID OXYGEN INTO LIQUID NITROGEN

CROSS REFERENCE TO RELATED APPLICATIONS

This application claims the benefit of priority under 35 U.S.C. § 119 (a) and (b) to U.S. Provision Patent Application No. 63/089,578, filed Oct. 9, 2020, the entire contents of which are incorporated herein by reference.

BACKGROUND

Since air separation plants have operational lifespans of thirty years or more, the production requirements from a plant may change significantly in its lifetime due to changing customer needs. This situation creates a challenge when an air separation plant originally designed with a minimum production rate for liquid oxygen exceeds the currently required demand for liquid oxygen. Since liquid nitrogen is normally consumed to produce liquid oxygen, liquid nitrogen available for sale is reduced at the same time it is the product in higher demand. This situation results in the excess liquid oxygen product being disposed of or dumped resulting in higher production costs spread over a smaller volume of saleable product. This disclosure describes a method and apparatus to cost effectively convert the excess liquid oxygen into liquid nitrogen allowing the production rate to be better balanced and lower the overall production cost per unit product sold. This unit may be run either continuously or in a campaign mode in conjunction with air separation and nitrogen liquefier units at a site to best match product demand.

SUMMARY

A method for converting excess liquid oxygen into liquid nitrogen, including introducing a gaseous nitrogen stream into a main heat exchanger, therein exchanging heat with a vaporized oxygen stream, a vapor phase nitrogen steam, and a waste liquid nitrogen stream; thereby producing a cold gaseous nitrogen stream, an oxygen vent stream, a nitrogen vent steam, and a gaseous nitrogen waste stream, introducing the cold gaseous nitrogen stream into a secondary heat exchanger, therein exchanging heat with a liquid oxygen stream; thereby producing the vaporized oxygen stream and a cold liquid nitrogen stream, introducing the cold liquid nitrogen stream into a nitrogen pressure reduction valve thereby producing a two-phase nitrogen stream, introducing the two-phase nitrogen stream into a nitrogen flash vessel thereby producing a liquid phase nitrogen stream and the vapor phase nitrogen stream, wherein the method is performed in the absence of refrigerant turbo-expanders, refrigerant expansion turbines, or refrigerant compressors.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

ELEMENT NUMBERS

101=medium pressure gaseous nitrogen stream
102=main heat exchanger
103=cold gaseous nitrogen stream
104=secondary heat exchanger
105=cold liquid nitrogen stream
106=nitrogen pressure reduction valve
107=two-phase nitrogen stream
108=nitrogen flash vessel
109=liquid phase nitrogen stream (from nitrogen flash vessel)
110=vapor phase nitrogen steam (from nitrogen flash vessel)
111=liquid nitrogen export stream
112=first liquid nitrogen waste stream
113=liquid nitrogen level control valve
114=liquid nitrogen product stream
115=liquid nitrogen temperature control valve
116=second liquid nitrogen waste stream
117=gaseous nitrogen waste stream
118=liquid oxygen stream
119=vaporized oxygen stream
120=oxygen vent stream
121=nitrogen vent stream
122=level sensor
123=temperature sensor (on gaseous nitrogen waste stream)
124=temperature sensor (on nitrogen vent stream)
125=temperature sensor (on oxygen vent stream)
201=inner condenser (in second heat exchanger)
202=liquid oxygen (in second heat exchanger)
203=liquid oxygen purge stream
301=air separation unit (optional)
302=nitrogen generation unit (optional)
303=nitrogen stream
304=system nitrogen feed compressor (optional)
305=liquid nitrogen product stream pump (optional)
306=high-pressure liquid nitrogen product stream
401=sub-cooler
402=subcooled first liquid nitrogen stream
403=warmed nitrogen vapor steam (from nitrogen flash vessel)
404=warmed second liquid nitrogen waste stream
501=export sub-cooler
502=subcooled liquid nitrogen storage stream
503=warmed second liquid nitrogen waste stream

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As used herein, the term "ambient temperature" is defined as the temperature of the surrounding air and is thus dependent upon the location of the installation. Ambient temperature may be defined as between 32 and 100 F, preferably between −20 and 120 F. Ambient temperature may be defined as between 50 and 80 F. Ambient temperature may be defined as between 65 and 75 F.

Figure 1:
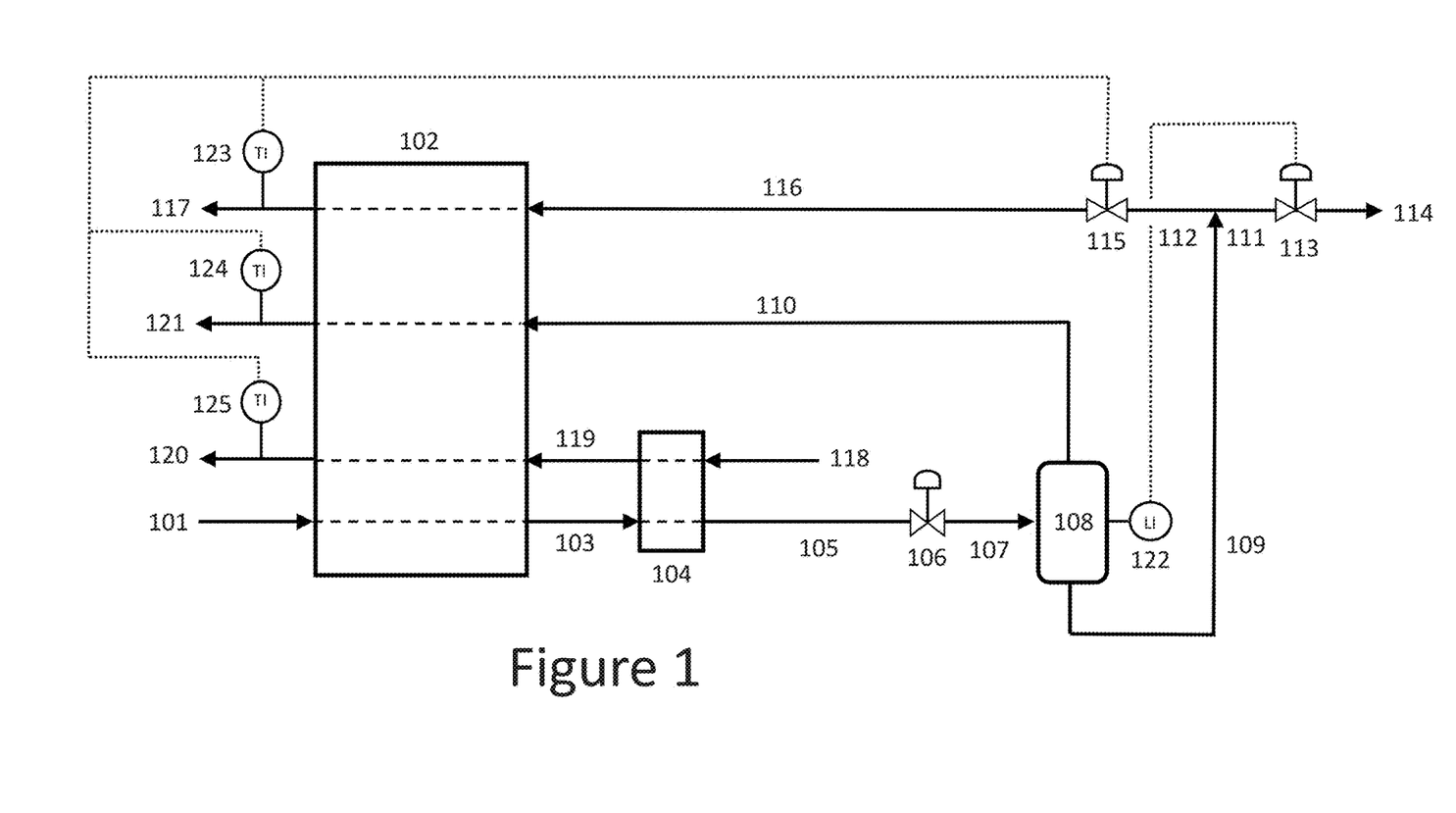
FIG. 1 is a schematic representation of a method of converting excess oxygen into liquid nitrogen, in accordance with one embodiment of the present invention.

Turning now to FIG. 1, an apparatus comprising main heat exchanger 102, secondary heat exchanger 104, and nitrogen flash vessel 108 is provided. This apparatus also comprises liquid nitrogen temperature control valve 115, level sensor 122, liquid nitrogen level control valve 113, and nitrogen pressure reduction valve 106. This apparatus may have a temperature sensor located on one or more warm lines exiting main heat exchanger 102. Temperature sensor 123 may be configured to sense the temperature in warm gaseous nitrogen waste stream 117. Temperature sensor 124 may be configured to sense the temperature in nitrogen vent stream 121. Temperature sensor 125 may be configured to sense the temperature in oxygen vent stream 120.

Main heat exchanger 102, is configured to allow at least the following four process streams to indirectly exchange heat: medium pressure gaseous nitrogen stream 101, vapor phase nitrogen steam 110, second liquid nitrogen waste stream 116, and vaporized oxygen stream 119. Secondary heat exchanger 104 is configured to allow at least the following two process streams to indirectly exchange heat: cold gaseous nitrogen stream 103, and liquid oxygen stream 118. Nitrogen flash vessel 108 is configured to have a two-phase nitrogen inlet stream 107 and at least liquid phase nitrogen stream 109 and a vapor phase nitrogen steam 110. In some embodiments, main heat exchanger 102 and secondary heat exchanger 104 may be the same heat exchanger (not shown).

One or more of temperature sensors 123, 124, or 125 is configured to sense the temperature in a warm stream exiting main heat exchanger 102 and provide input to liquid nitrogen temperature control valve 115. Liquid nitrogen temperature control valve 115 is configured to regulate the flowrate of first liquid nitrogen waste stream 112, thereby maintaining a positive temperature difference between the warm streams exiting main heat exchanger 102 and the cold streams entering it.

Level sensor 122 is configured to sense the liquid nitrogen level in nitrogen flash vessel 108 and provide input to liquid nitrogen level control valve 113. Liquid nitrogen level control valve 113 is configured to regulate the flowrate of liquid nitrogen export stream 111, thereby affecting the liquid nitrogen level in nitrogen flash vessel 108, Nitrogen pressure reduction valve 106 is configured to reduce the pressure in cold liquid nitrogen stream 105, thereby producing two-phase nitrogen stream 107.

Again, with reference to FIG. 1, medium pressure gaseous nitrogen stream 101 is provided to first heat exchanger 102, wherein it indirectly exchanges heat with vaporized oxygen stream 119, vapor phase nitrogen steam 110 (from nitrogen flash vessel 108), and second liquid nitrogen waste stream 116, thereby producing cold gaseous nitrogen stream 103, warm oxygen vent stream 120, warm gaseous nitrogen waste stream 117, and warm nitrogen vent stream 121. Medium pressure gaseous nitrogen stream 101 may be at ambient temperature, and a pressure that is sufficiently elevated to provide a condensation temperature that is high enough to boil liquid oxygen stream 118. Medium pressure gaseous nitrogen stream 101 may be at a pressure of less than 100 psig, preferably between 70 psig and 80 psig. Cold gaseous nitrogen stream 103 may be near the condensation temperature. Warm oxygen vent stream 120 may be near ambient temperature. Warm nitrogen vent stream 121 may be near ambient temperature.

Liquid oxygen stream 118 is provided to second heat exchanger 104. Liquid oxygen stream 118 may come from any available source, such as a liquid oxygen storage tank (not shown). Liquid oxygen stream 118 may be at a pressure of less than 15 psig, preferably between 5 psig and 10 psig. Within second heat exchanger 104, liquid oxygen stream 118 exchanges heat indirectly with at least cold gaseous nitrogen stream 103, thereby producing cold liquid nitrogen stream 105 and vaporized oxygen stream 119.

Cold liquid nitrogen stream 105 is introduced into first nitrogen pressure reduction valve 106 thereby producing two-phase nitrogen stream 107, which is then introduced into nitrogen flash vessel 108. Nitrogen flash vessel 108 produces at least liquid phase nitrogen stream 109 and vapor phase nitrogen steam 110. Liquid phase nitrogen stream 109 is divided into at least two parts; liquid nitrogen export stream 111 and first liquid nitrogen waste stream 112. First liquid nitrogen waste stream 112 is introduced into liquid nitrogen temperature control valve 115, thereby producing second liquid nitrogen waste stream 116. Liquid nitrogen export stream 111 is introduced into first nitrogen level control valve 113, thereby producing liquid nitrogen product stream 114. Liquid nitrogen product stream 114 may then be used internally, exported or stored in a liquid nitrogen storage tank (not shown).

Nitrogen flash vessel 108 may have level sensor 122 which may be used to control first nitrogen level control valve 113. Accordingly, first nitrogen level control valve 113 may be opened or closed in order to maintain a desired liquid nitrogen level in nitrogen flash vessel 108. Warm gaseous nitrogen waste stream 117 may have temperature sensor 122 which may be used to control liquid nitrogen temperature control valve 115. Accordingly, in order to help regulate the overall duty of first heat exchanger 102, liquid nitrogen temperature control valve 115 may be opened or closed in order to regulate the outlet temperature of warm gaseous nitrogen waste stream 117.

Figure 2:
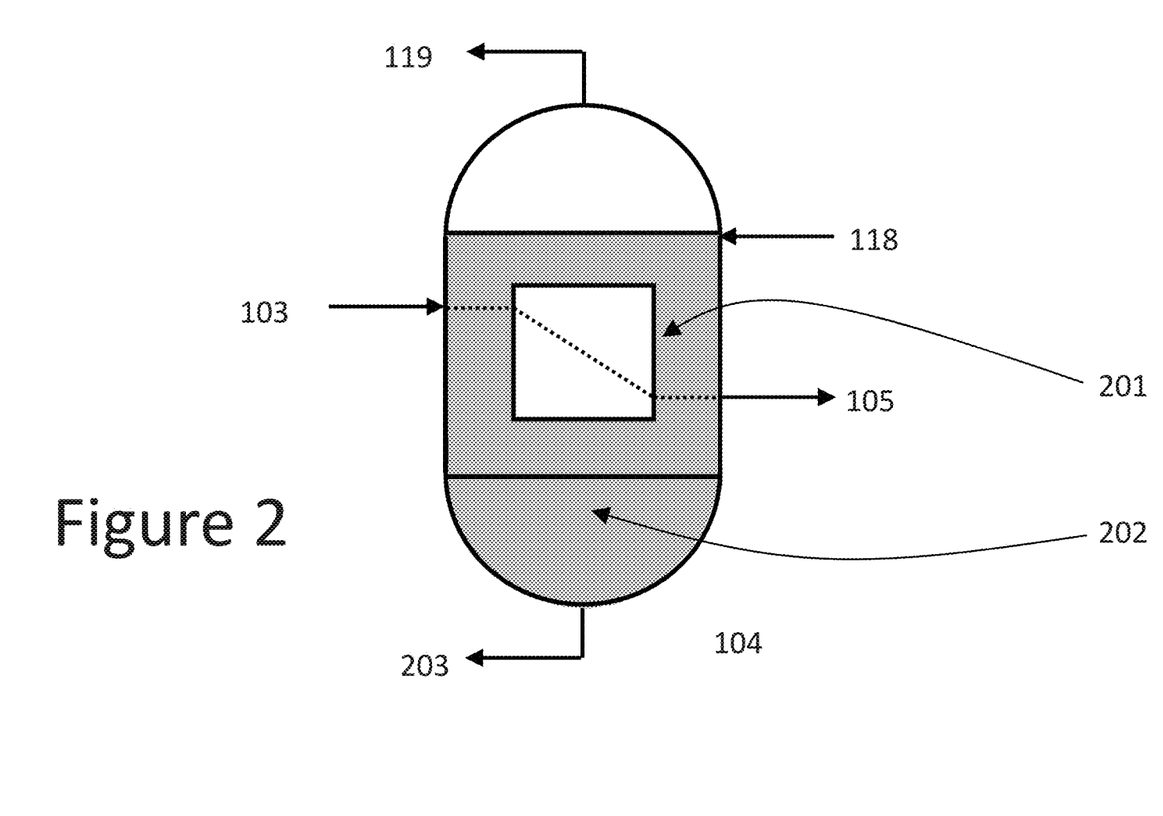
FIG. 2 is a schematic representation of the secondary heat exchanger, in accordance with one embodiment of the present invention

Turning to FIG. 2, a more detailed description of one embodiment of secondary heat exchanger 104 is provided. Liquid oxygen stream 118 is provided to second heat exchanger 104. Cold gaseous nitrogen stream 103 is directed to inner condenser 201 which is at least partially submerged in liquid oxygen 202, thereby producing cold liquid nitrogen stream 105. After indirectly exchanging heat with cold gaseous nitrogen stream 103, at least a portion of the oxygen is vaporized, and exits secondary heat exchanger 104 as vaporized oxygen stream 119. Over time, any impurities present in liquid oxygen 202 will tend to accumulate. Thus, a portion of liquid oxygen 202 may be removed from secondary heat exchanger 104 as liquid oxygen purge stream 203

One non-limiting example of this system is illustrated below in Table 1.

TABLE 1

| Stream |  | 101 | 103 | 105 | 107 | 110 | 114 |
|---|---|---|---|---|---|---|---|
| Flowrate | lb/hr | 7626 | 7626 | 7626 | 7626 | 939 | 6687 |
| Pressure | psig | 66 | 63 | 62 | 15 | 5 | 15 |
| Temperature | F. | 70 | −288 | −289 | −309 | −316 | −309 |
| Stream |  | 116 | 117 | 118 | 119 | 120 | 121 |
| Flowrate | lb/hr | 758 | 758 | 6266 | 6183 | 6183 | 939 |
| Pressure | psig | 5 | 2 | 5 | 5 | 2 | 2 |
| Temperature | F. | −316 | 65 | −292 | −292 | 65 | 65 |

Figure 3:
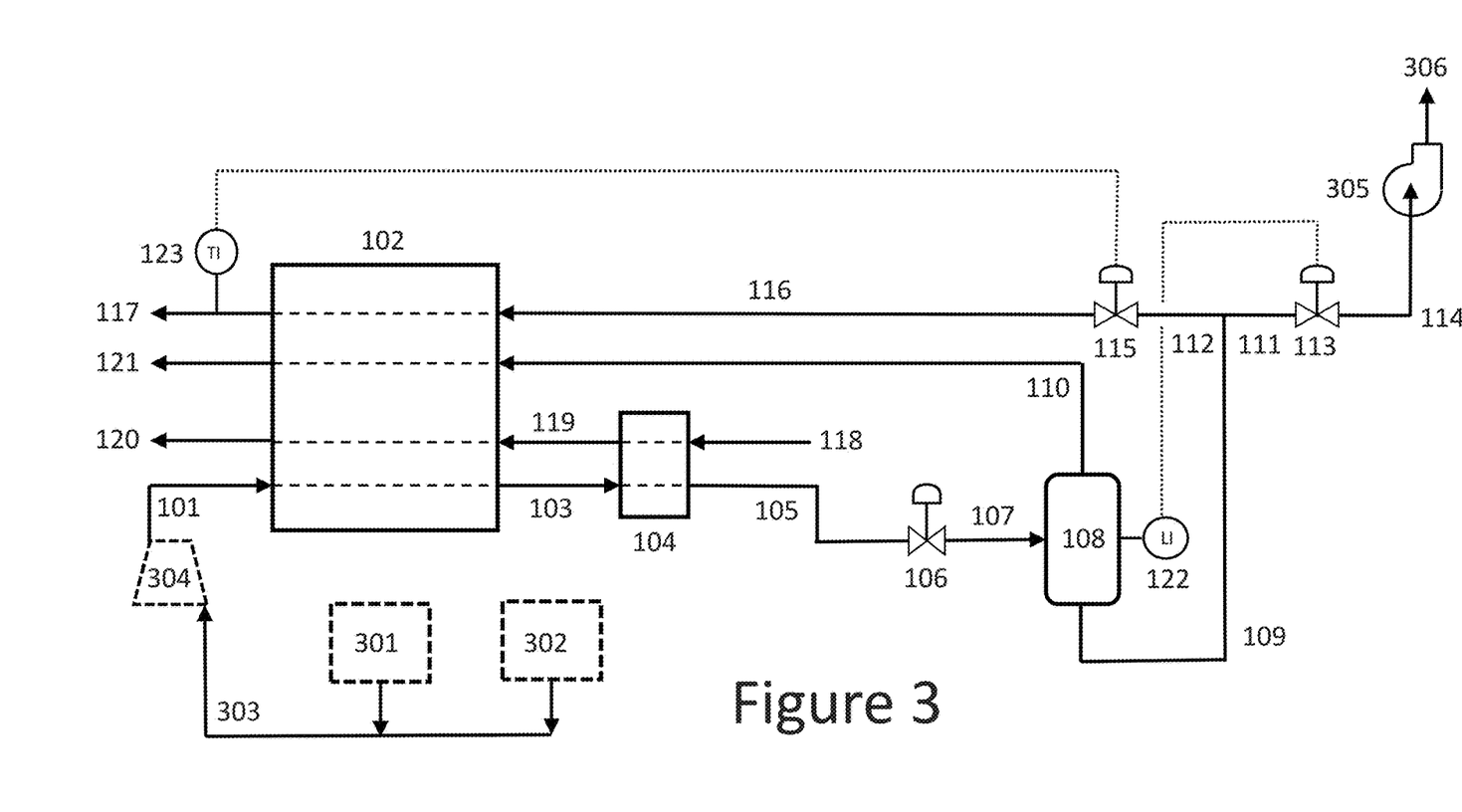
FIG. 3 is a schematic representation of a method of converting excess oxygen into liquid nitrogen illustrating several optional features, in accordance with one embodiment of the present invention.

Turning now to FIG. 3, alternative embodiments of the apparatus previously explained in FIG. 1 is described. One or more of these alternative embodiments comprises air separation unit 301, and nitrogen generation unit 302. These alterative embodiments may also comprise system nitrogen feed compressor 304 and/liquid nitrogen product stream pump 305.

System nitrogen feed compressor 304 is configured to compress nitrogen stream 303 to a pressure sufficient to satisfy the process requirements of the system. System nitrogen feed compressor 304 may be a stand-alone compressor, part of a separate nitrogen liquefaction unit (not shown) or a product pipeline compression system (not shown). Liquid nitrogen product stream pump 305 is configured to compress at least liquid nitrogen product stream 114 but may also be configured to compress cold liquid nitrogen stream 105 and or nitrogen stream 303 to a pressure sufficient to satisfy the process requirements of the system Again, with reference to FIG. 3, alternative embodiments of the present invention are disclosed. In the interest of consistency and clarity, the same element numbers are used as in FIG. 1. In one embodiment, the source of medium pressure gaseous nitrogen stream 101 may be air separation unit 301, which may provide nitrogen stream 303 at either low-pressure or medium pressure. In one embodiment, the source of medium pressure gaseous nitrogen stream 101 may be nitrogen generation unit 302, which may provide nitrogen stream 303 at either low-pressure or medium pressure. If nitrogen stream 303 is delivered to the liquefaction system at low-pressure, system nitrogen feed compressor 304 may be used to elevate the nitrogen to the necessary pressure. In one embodiment, system nitrogen feed compressor 304 may also be used to increase the pressure of cold liquid nitrogen stream 105 prior to it being introduced into first nitrogen pressure reduction valve 106. This particular embodiment is not shown in the figure but would be well within the ability of one of ordinary skill in the art to design.

In another embodiment, liquid nitrogen product stream 114 may be introduced into liquid nitrogen product stream pump 305, thereby producing high-pressure liquid nitrogen product stream 306.

In one embodiment, into liquid nitrogen product stream pump 305 may also be used to increase the pressure of cold liquid nitrogen stream 105 prior to it being introduced into first nitrogen pressure reduction valve 106, and or to increase the pressure of nitrogen stream 303. This particular embodiment is not shown in the figure but would be well within the ability of one of ordinary skill in the art to design.

Figure 4:
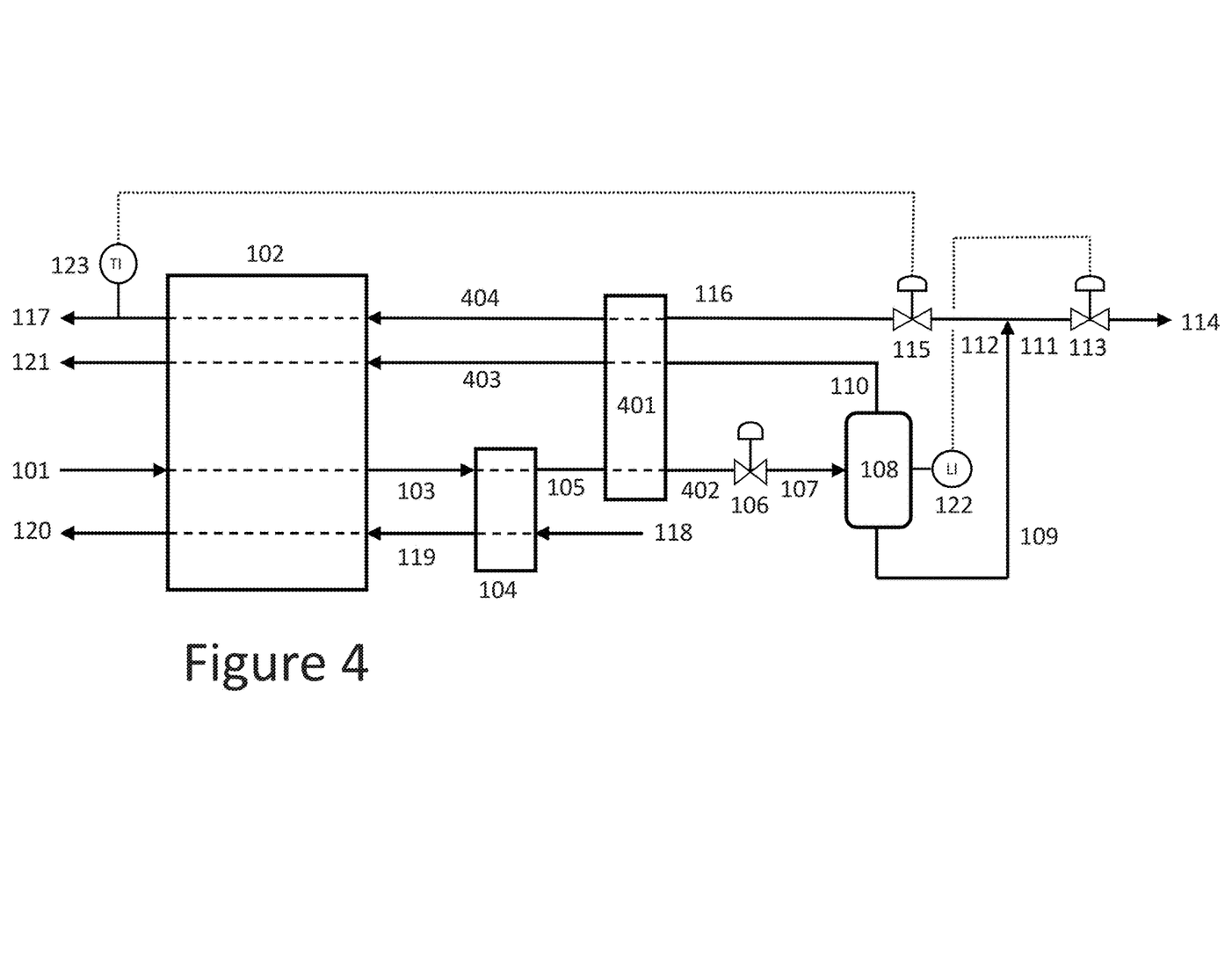
FIG. 4 is a schematic representation of a method of converting excess oxygen into liquid nitrogen illustrating one possible location for a sub-cooler, in accordance with one embodiment of the present invention.

Turning now to FIG. 4, an alternative embodiment of the apparatus previously explained in FIG. 1 is described. Sub-cooler 401 is configured to allow at least the following three process streams to indirectly exchange heat: cold liquid nitrogen stream 105, vapor phase nitrogen steam 110, second liquid nitrogen stream 116.

Again, with reference to FIG. 4, another alternative embodiment of the present invention is disclosed. In the interest of consistency and clarity, the same element numbers are used as in FIG. 1. Sub-cooler 401 may be added to the system, thus allowing cold vapor phase nitrogen steam 110 and cold second liquid nitrogen waste stream 116 to indirectly exchange heat with cold liquid nitrogen stream 105, thereby producing subcooled first liquid nitrogen stream 402, warmed nitrogen vapor stream 403, and warmed second liquid nitrogen stream 404.

Figure 5:
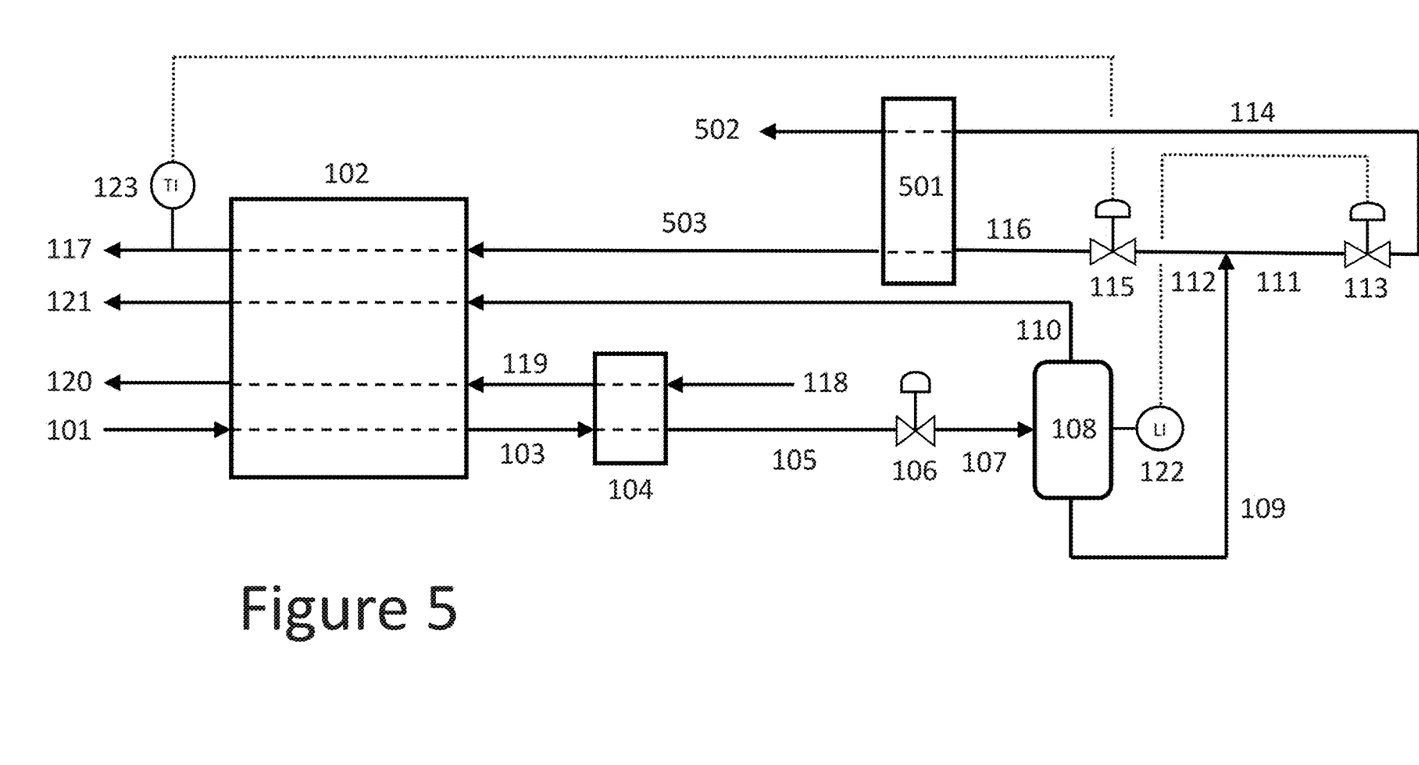
FIG. 5 is a schematic representation of a method of converting excess oxygen into liquid nitrogen illustrating another possible location for a sub-cooler, in accordance with one embodiment of the present invention.

Turning now to FIG. 5, an alternative embodiment of the apparatus previously explained in FIG. 1 is described. Export sub-cooler 501 is configured to allow at least the following two process streams to indirectly exchange heat: liquid nitrogen product stream 114 and second liquid nitrogen stream 116.

Again, with reference to FIG. 5, another alternative embodiment of the present invention is disclosed. In the interest of consistency and clarity, the same element numbers are used as in FIG. 1. Export sub-cooler 501 may be added to the system, thus allowing liquid nitrogen product stream 114 to indirectly exchange heat with cold second liquid nitrogen waste stream 116, thereby producing subcooled liquid nitrogen storage stream 502 and warmed second liquid nitrogen waste stream 503.

One of ordinary skill in the art recognizes that in a typical nitrogen liquefier as known in the art, refrigeration is generated using turbo-expanders in a recycle loop. Gaseous nitrogen is liquefied by indirect heat exchange with this refrigeration loop. In contrast, in the inventive system and apparatus described herein, the refrigeration is being provided solely by excess liquid oxygen, either from our process or from a storage tank. In the present system and apparatus, there is no refrigerant turbo-expanders, no refrigerant expansion turbines, and no refrigerant compressors in the refrigeration cycle.

Available, and possibly excess, liquid oxygen that would otherwise be vaporized in a disposal unit is utilized as refrigerant. Whereas, otherwise, all the refrigeration potential of this liquid oxygen would be wasted. This is a unique system and apparatus, because it would generally only be useful within a facility that routinely generates more liquid oxygen at a minimum than the typical local demand.

The inventive system and apparatus described herein would have no utility without excess liquid oxygen available on site, because it can generate no refrigeration on its own. This method and system constitutes a net gain to the plants overall efficiency by reducing the liquid oxygen that would otherwise be wasted, and to meet market demands for liquid nitrogen, the already liquefied oxygen may be used as a refrigeration source to liquefy gaseous nitrogen.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for exchanging heat between an excess liquid oxygen stream with a gaseous nitrogen stream to produce an additional liquid nitrogen stream, comprising:
   introducing a gaseous nitrogen stream into a main heat exchanger, therein indirectly exchanging heat with a vaporized oxygen stream, a vapor phase nitrogen steam, and a waste liquid nitrogen stream; thereby producing a cold gaseous nitrogen stream, a warm oxygen vent stream, a warm nitrogen vent steam, and a warm gaseous nitrogen waste stream,
   introducing the cold gaseous nitrogen stream into a secondary heat exchanger, therein indirectly exchanging heat with a liquid oxygen stream; thereby producing the vaporized oxygen stream and a cold liquid nitrogen stream,
   introducing the cold liquid nitrogen stream into a nitrogen pressure reduction valve thereby producing a two-phase nitrogen stream,
   introducing the two-phase nitrogen stream into a nitrogen flash vessel thereby producing a liquid phase nitrogen stream and the vapor phase nitrogen stream,
   wherein the method is performed in the absence of refrigerant turbo-expanders, refrigerant expansion turbines, or refrigerant compressors.

2. The method of claim 1, further comprising a temperature sensor functionally attached to the warm gaseous nitrogen waste stream, thereby detecting the temperature and a liquid nitrogen temperature control valve functionally receiving a control signal from the temperature sensor, controlling the flowrate of the waste liquid nitrogen stream and thereby controlling the temperature of the warm gaseous nitrogen waste stream.

3. The method of claim 1, further comprising providing a nitrogen stream from an air separation unit and compressing the nitrogen stream in a system nitrogen feed compressor thereby producing the gaseous nitrogen stream.

4. The method of claim 1, further comprising providing a nitrogen stream from a nitrogen generation unit and compressing the nitrogen stream in a system nitrogen feed compressor thereby producing the gaseous nitrogen stream.

5. The method of claim 1, further comprising pressurizing the liquid phase nitrogen stream in a liquid nitrogen product stream pump configured to compress a liquid nitrogen storage stream thereby producing a high-pressure liquid nitrogen product stream.

6. The method of claim 1, further comprising sub-cooling the cold liquid nitrogen stream in a sub-cooler, by indirect heat exchange with the vapor phase nitrogen stream, and the waste liquid nitrogen stream; thereby producing a subcooled first liquid nitrogen stream which is then introduced into the nitrogen pressure reduction valve.

7. The method of claim 1, further comprising a level sensor functionally attached to the nitrogen flash vessel thereby detecting the liquid nitrogen level in the nitrogen flash vessel, and a liquid nitrogen level control valve functionally receiving a control signal from the level sensor, controlling the flowrate of a liquid nitrogen product stream and thereby controlling the level of liquid nitrogen level in the nitrogen flash vessel.

8. The method of claim 7, further comprising sub-cooling the liquid nitrogen product stream in an export sub-cooler, by indirect heat exchange with the waste liquid nitrogen stream, thereby producing a subcooled liquid nitrogen storage stream.

* * * * *